United States Patent [19]
Irie et al.

[11] Patent Number: 6,092,099
[45] Date of Patent: Jul. 18, 2000

[54] DATA PROCESSING APPARATUS, DATA PROCESSING METHOD, AND COMPUTER READABLE MEDIUM HAVING DATA PROCESSING PROGRAM RECORDED THEREON

[75] Inventors: Yutaka Irie, Yokohama; Akihiko Ohsuga, Kawasaki, both of Japan

[73] Assignee: Kabushiki Kaisha Toshiba, Kawasaki, Japan

[21] Appl. No.: 09/175,444

[22] Filed: Oct. 20, 1998

[30] Foreign Application Priority Data

Oct. 23, 1997 [JP] Japan .................................. 9-290944

[51] Int. Cl.[7] ........................................................ G06F 13/00
[52] U.S. Cl. .................................................... 709/202
[58] Field of Search ................................ 707/1, 3, 4, 5, 707/10; 709/200, 202, 203

[56] References Cited

U.S. PATENT DOCUMENTS 5,970,490 10/1999 Morgenstern ............................ 707/10

*Primary Examiner*—Robert B. Harrell
*Attorney, Agent, or Firm*—Banner & Witcoff Ltd.

[57] ABSTRACT

This invention provides a technology for using a plurality of databases each having dissimilar data structure with each other. A user specified, on a portable terminal P, a search condition based on a global ontology G, a list of data items common to the plurality of databases. An agent A is sent from an agent launcher L to a connection node S. In the connection node S, data used as a table or a dictionary containing information on a correspondence between the global ontology G and each of the databases is provided. A search condition based on the global ontology G is translated based on the data to a format compatible with the structure of each database. The agent A, with the translated search condition, moves to a node where each database is located, transfers the search result obtained at each node, and then returns to the connection node S.

18 Claims, 12 Drawing Sheets

DB RESEARCH AGENT LAUNCHER (EJECT)

SEARCH CONDITION 1
SEARCH CONDITION 2
SEARCH CONDITION 3
SEARCH CONDITION 4
SEARCH CONDITION 5
SEARCH CONDITION 6
SEARCH CONDITION 7

SEARCH PERIOD from ☐ Y ☐ M ☐ D
SEARCH PERIOD to ☐ Y ☐ M ☐ D

USER NAME
PASSWORD

COMMENT:
TYPE A SEARCH CONDITION AND CLICK THE EJECT BUTTON

*FIG. 5*

LIST OF SENT AGENTS

CURRENT STATUS

| NUMBER | LAUNCH DATE | ATTRIBUTE | KEYWORD | from/to |
|--------|-------------|-----------|---------|---------|
| 1 | 97/09/08 10:00:00 | | AREA=TOKYO | server1 -> host1 -> host2 -> |
| 2 | 97/09/08 10:01:15 | F | EMPLOYEE NUMBER=12131 | server1 -> host1 -> host2 -> |
| 3 | 97/09/08 10:01:50 | F | AREA=TOKYO/DIVISION=2 | |
| 4 | 97/09/08 10:03:22 | | AGE>35 | |
| 5 | 97/09/08 10:04:00 | | AREA=NAGANO/AGE>40 | |
| 6 | 97/09/08 10:04:37 | | DIVISION=4/ENTRANCE YEAR= | |
| 7 | 97/09/08 10:06:07 | | AREA=KANAGAWA/SALARY>= | |
| 8 | 97/09/08 10:06:44 | | AREA=HOKKAIDO/BIRTHPLACE= | |
| 9 | 97/09/08 11:07:30 | | EMPLOYEE NUMBER=12345 | |
| 10 | 97/09/08 11:08:23 | | AREA=OSAKA/ENTRANCE YEAR< | |

LIST OF SENT AGENTS

| NUMBER | LAUNCH DATE | | ATTRIBUTE | KEYWORD |
|---|---|---|---|---|
| 1 | 97/09/08 | 10:00:00 | F | AREA=TOKYO |
| 2 | 97/09/08 | 10:01:15 | F | EMPLOYEE NUMBER=12131 |
| 3 | 97/09/08 | 10:01:50 | R | AREA=TOKYO/DIVISION=2 |
| 4 | 97/09/08 | 10:03:22 | R | AGE>35 |
| 5 | 97/09/08 | 10:04:00 | R | AREA=NAGANO/AGE>40 |
| 6 | 97/09/08 | 10:04:37 | NR | DIVISION=4/ENTRANCE YEAR= |
| 7 | 97/09/08 | 10:06:07 | R | AREA=KANAGAWA/SALARY>= |
| 8 | 97/09/08 | 10:06:44 | NR | AREA=HOKKAIDO/BIRTHPLACE= |
| 9 | 97/09/08 | 11:07:30 | NR | EMPLOYEE NUMBER=12345 |
| 10 | 97/09/08 | 11:08:23 | NR | AREA=OSAKA/ENTRANCE YEAR< |

CURRENT STATUS

| from/to |
|---|
| server1 -> host1 -> host2 -> |
| server1 -> host1 -> host2 -> |
| server1 -> host1 -> host2 -> |
| server1 -> host1 -> host2 -> |
| server1 -> host1 -> host2 -> |
| server1 -> host1 -> host2 -> |
| server1 -> host1 |
| server1 -> host1 -> host2 |
| server1 -> host1 |
| server1 |

LIST OF SEARCH RESULTS

| SEARCHED DATABASE | IMAGE | CONTENTS/SEARCH TARGET KEY |
|---|---|---|
| host1 / Default / Database | | AGE=36 |
| host1 / Default / Database | | AGE=59 |
| host1 / Default / Database | | AGE=42 |
| host2 / Default / Database | | AGE=47 |
| host2 / Default / Database | | AGE=38 |
| host2 / Default / Database | | AGE=48 |
| host2 / Default / Database | | AGE=55 |
| host3 / Default / Database | | AGE=54 |
| host3 / Default / Database | | AGE=41 |
| host3 / Default / Database | | AGE=40 |
| host3 / Default / Database | | AGE=53 |

*FIG. 11*

DATA PROCESSING APPARATUS, DATA PROCESSING METHOD, AND COMPUTER READABLE MEDIUM HAVING DATA PROCESSING PROGRAM RECORDED THEREON

BACKGROUND OF THE INVENTION

1. Field of the Invention

This invention relates to an improvement in the technology for processing data remotely, and more particularly to the technology for using easily a plurality of databases each having different data structure from each other and for the technology for using agents efficiently even when a connection is difficult to establish while a terminal is moving.

2. Description of the Related Art

Recently, with the advance of the mobile communication technology and the miniaturization of a data processing apparatus, mobile computing has rapidly become popular. Mobile computing, which usually refers to the technology allowing a user to use a portable computer outside the office, also refers to the technology allowing the user to remotely access, over a telephone line from outside the office, to utilize a computer environment in the office.

One of mobile computing applications is the technology allowing the user to connect to the host system of a network and the like from the terminal over a telephone line and to access a database via a connection node such as a World Wide Web (WWW) server. With this technology, the user specifies a search condition in a Web page to search the database. Then, the search result is displayed in a new Web page. During this search, data is transferred between the user and the network in Web pages which are the smallest units (sessions) of data transferred between them at a time. As compared with a conventional client-server system, the sessions used during the transfer of Web pages are much smaller.

For this reason, searching a database with the use of Web pages is considered to be best for mobile computing in which the line connection is apt to be unstable. However, depending upon the load on the connection nodes via which a connection is established or on the database search method to be used, it may take long from the time a search request is issued to the time the result is displayed, sometimes requiring the user to stay connected to the host system for several minutes. And, once the connection with the host system is broken during the transfer of data, all the Web pages must be re-displayed.

To reduce the time during which the user must stay connected to the host system, a so-called mobile agent, a program sent from a portable terminal to the host system, is used. With the mobile agent, the user can connect the terminal to the host system where a desired database is provided and, once the agent having a processing procedure included is sent from the terminal to the host system, disconnect from the host system. The agent sent to the host system searches the database according to the given procedure and, when the result is obtained, either the portable terminal calls up the host system, or vice versa, to return the result to the user's terminal. The use of this mobile agent eliminates the need to stay connected to the host system during database search operation, making it possible to reduce the amount of communication.

The problem with the related system described above is that it is difficult for the user to utilize a plurality of databases. That is, with the conventional Web-page based search or the mobile agent which is designed to access a single database, it is difficult to access two separate databases at a time. In this case, it should be noted that "two separate databases", though dissimilar in data structure (schema) formally, contain data similar with each other in content or attribute in most cases. For example, consider two personnel information databases developed by two separate divisions of a company. In this case, searching for employees satisfying specified conditions or having specified qualifications requires the user to search the two databases dissimilar in data structure.

That is, locally-generated data should be stored in local databases to prevent database sizes and loads from increasing; on the other hand, the plurality of databases sometimes contain data to be shared among them.

Thus, searching a plurality of databases, each with dissimilar data structure with each other, requires the user to change the search request format according to the data structure of each database. Not only does the user find it bothersome to switch among a plurality of databases and change the request format manually but also the communication time becomes longer. Therefore, searching a plurality of databases is not suitable for mobile computing. In addition, the conventional agent does not access a plurality of databases, nor does it work with a plurality of data structures dissimilar with each other.

Another known access technology is that two separate databases have the same record structure to allow access to the two databases. However, this function cannot be combined with the conventional agent which does not move within the host system to access a plurality of databases. In addition, the use of the common record structure requires that the databases be designed to have the common record structure from the database development stage. This is cumbersome and cannot be applied to existing databases.

For connecting the host system and terminals such as Personal Hadyphone System (PHS) telephones used in a communication mode not intended for mobile communication, it is difficult to access databases while moving from one location to another. That is, although the user who remotely accesses a database outside the office must move frequently in many cases, the communication method, such as that used by the PHS, does not give the user stable connections while the user is moving from one location to another. This is because, in the PHS system where the output from an antenna base station is very weak, the connection is frequently broken if the user changes his or her locations frequently. This means that the user must stay within an area where the radio wave is strong sufficiently during communication using a PHS telephone.

On the other hand, the user using the conventional mobile agent technology sends an agent to the host system, one at a time, and receives the result. Therefore, when making a plurality of search requests to get many pieces of information from databases, the user must send agents, and receives results, continuously while staying connected to the line. The result is that the communication time becomes long and, therefore, the user cannot leave the place during that time.

Furthermore, in a system where the conventional mobile agent technology is used, even when the host tries to send back a result to the terminal immediately after the result is obtained, the called terminal sometimes cannot respond while the user carrying it is moving in case of the PHS system. Thus, with the conventional mobile agent, the user finds it difficult to use databases in a communication mode not intended for mobile communication.

This invention seeks to solve the problems associated with the related art described above. It is an object of this invention to provide a technology which makes it easier for the user to use a plurality of databases each with dissimilar data structure with each other. It is another object of this invention to provide a technology which allows the user to use databases even over a communication line via which mobile communication is difficult.

SUMMARY OF THE INVENTION

To achieve the above-noted objects, the present invention is a data processing apparatus having a host system having a plurality of different databases and a terminal for connecting to said host system over a remote line, said data processing apparatus comprising: means for sending to said host system an agent which has a search condition given based on a global ontology representing a plurality of data items which can be searched in said plurality of databases; means for generating a plan based on an ontology bridge representing a correspondence between a data item of said global ontology and an item in at least one of databases, said plan being used by the agent to access databases; means for saving onto said host system a search result obtained through database search performed by said agent based on said plan; and means for sending the saved search result back to said terminal.

In this aspect of the present invention, the data items common to a plurality of databases are provided as the global ontology. Therefore, even when the a plurality of databases must be searched, the user can specify a search condition for the plurality of databases at a time easily with no concern over the data structure of each database. The search condition specified in this manner is translated to a search request compatible with the structure of each database based on the ontology bridge which functions as a dictionary. In addition, an agent searches the plurality of databases in the host system independently according to the plan, eliminating the need for communication between the user and the host system during the search and thus reducing the amount of communication.

Other and further objects, features, and advantages of the invention will appear more fully from the following description.

BRIEF DESCRIPTION OF THE DRAWINGS

FIG. 5 is a diagram showing an example of the screen on which search conditions are specified in the embodiment of this invention.

FIG. 9 is a diagram showing an example of the screen on which the history of an agent sent to the network is displayed in the embodiment of this invention.

FIG. 10 is a diagram showing an example of the screen on which the current status of an agent is displayed, based on the status record obtained from the connection node, in the embodiment of this invention.

FIG. 11 is a diagram showing an example of the screen on which a list of search results is displayed in the embodiment of this invention.

DETAILED DESCRIPTION OF THE PREFERRED EMBODIMENTS

The data processing apparatus (hereafter called "this apparatus") according to this invention will be described with reference to the attached drawings.

[1. Outline of the Embodiment]

Figure 1:
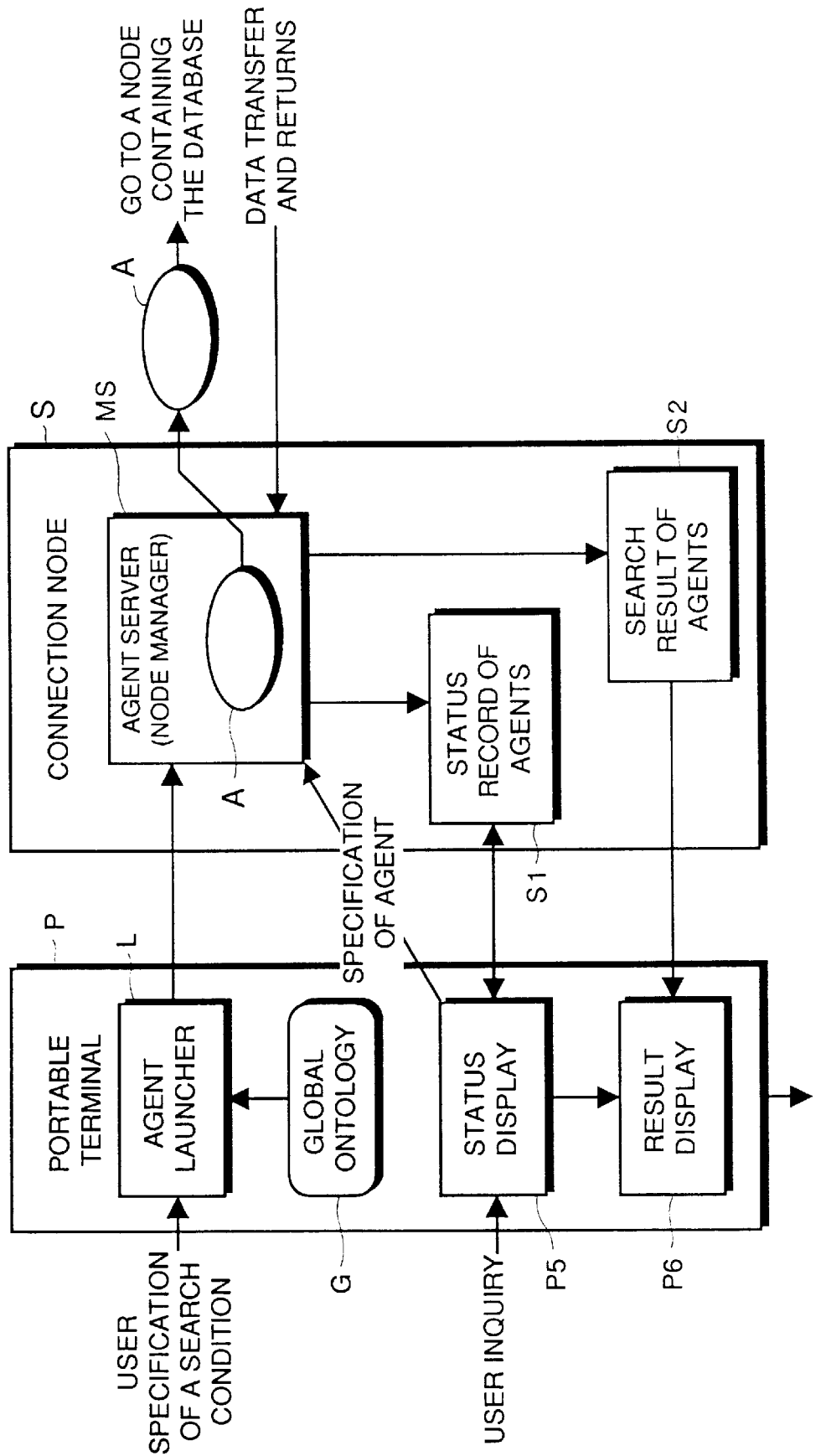
FIG. 1 is a diagram showing the concept of an embodiment of this invention.

In this embodiment, the user on a portable terminal P specifies a search condition as shown in FIG. 1. The portable terminal P (having a data processor and a memory) has a global ontology G, which contains a list of data items common to a plurality of databases owned by this apparatus. The search condition is specified based on this global ontology G. When the search condition is specified, an agent A is sent from an agent launcher L to a connection node S. The agent is a unit of software operating independently to achieve a given object.

The connection node S has a data processor and a memory storing a data which is a table or a dictionary representing the correspondence between the global ontology G and the structure of each database. The search condition specified based on the global ontology G is translated into a format compatible with the structure of each database based on the data. The agent A, with the translated search condition, goes to a node where each database resides and, after transferring the search result obtained at each node back to the connection node S, returns to the connection node S.

The user may send an inquiry to the connection node S to display the status of each agent A on a status display section P5. This status information is obtained from the status record S1 containing the status of the agents sent to the connection node S. The user may also select an agent A from those returned to the connection node S to display the search result on a result display section P6. The user may print the search result if he or she wants to.

[2. Configuration]

[2-1. Overall Configuration of the Apparatus]

Figure 2:
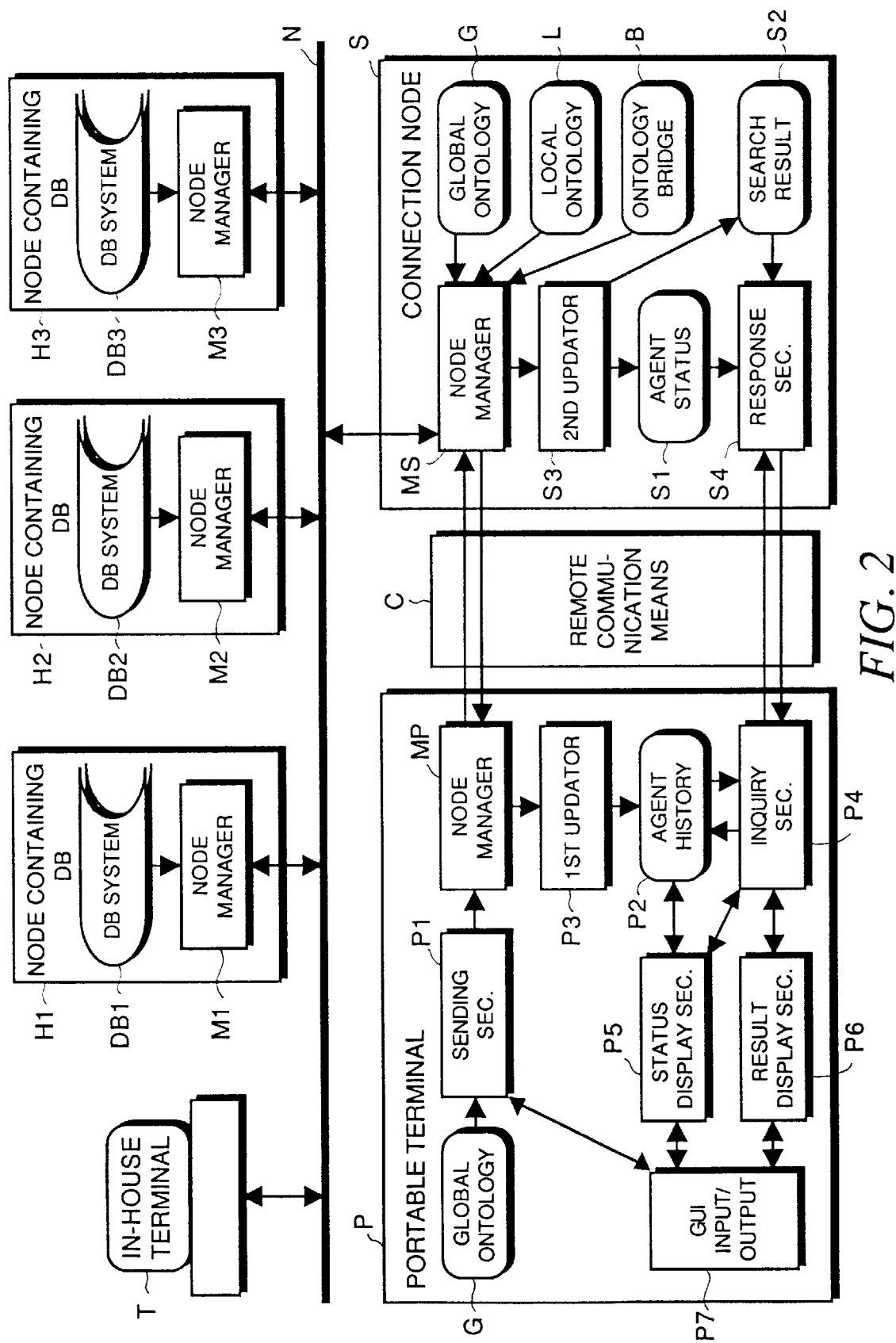
FIG. 2 is a functional block diagram showing the overall configuration of the embodiment of this invention.

Next, the configuration of this apparatus will be described more in detail. FIG. 2 is a functional block diagram showing the overall configuration of the apparatus. As shown in this figure, the apparatus is divided roughly into two parts: one is a network N which functions as a host system and the other is the portable terminal P which accesses the network N. The network N is constructed using, for example, a private LAN. As shown in FIG. 2, the connection node S and nodes H1–H3 each of which is a computer, remote communication means C, and one or more in-house terminals T are connected to the network. This network corresponds to a "host system" in the claims. It should be noted that the connection node S and portable terminal P connected to the network N are also called nodes.

The nodes H1–H3 are database servers having databases DB1–DB3 each of which is different from each other. For example, when the network N is a local area network built in a company, the nodes H1–H3 correspond to computers installed in branches or divisions of the company. The databases DB1–DB3 are databases built in nodes H1–H3 respectively. These databases, each of which has different data structure (sequence, name and field length of data items, and so on) from each other, contain substantially the same consents. In the following description, it is assumed that the data structure of each of the databases DB1–DB3 is known in advance.

This apparatus enables the user to search these plurality of distributed databases DB1–DB3 at a time to collect data. The connection node S, responsible for sending an agent to each of the nodes H1–H3, is called an agent distributor.

This apparatus has a node manager M which is means for implementing the operation of the agents used for the search operation. The node manager M is provided previously in the portable terminal P, connection node S, and each of the nodes H1–H3. They are represented as MP, MS, and M1–M3, respectively, and will be described later in detail. The node managers MS and M1–M3 correspond to "means for activating agents" in claims 3, 4 and 9.

[2-2. Configuration of the Portable Terminal]

Next, the portable terminal P will be described. The portable terminal P is provided with hardware and a communication protocol for connection to the connection node S via a PHS line; for example, it has a connection interface with a PHS terminal or is integrated in the PHS terminal. The portable terminal P has the global ontology G previously stored. The global ontology G, which is an information representing data items that can be searched in the plurality of databases DB1–DB3, is typically a list of data items common to databases DB1–DB3.

The data items contained in the global ontology G have, in addition to actual names assigned in the databases DB1–DB3, more generic names so that the user can make a request to a virtual single database represented by the global ontology G.

The portable terminal P has a Graphical User Interface (GUI) input/output section P7 which sends information to the user and receives information and operation requests from the user, a sending section P1 which sends an agent to the connection node S, and a first updating section (first updator) P3 which updates an agent history P2 which is history data on the agents sent to the network N. The GUI input/output section P7, sending section P1, and node manager MP correspond to "means for sending" in claims 1 and 8, and to the agent launcher L in FIG. 1. Also, the first updator P3 corresponds to "means for recording a history" in claim 8.

The portable terminal P also has an inquiry section P4 which sends to the network N an inquiry about the status of a sent agent, the status display section P5 which displays the status of each sent agent based on information provided from the connection node S, and the result display section P6 which displays the search result obtained by each agent. The inquiry section P4 corresponds to "means for receiving" in claim 8.

[2-3. Configuration of the Connection Node]

The connection node S will be described. The connection node S, a computer receiving a connection request from the portable terminal P, is connected to the remote connection means C which receives a connection request from external units. The remote communication means C, connected to the PHS line, has devices such as a PHS control unit or a firewall, for accepting external connection requests and a communication protocol for the portable terminal P.

The connection node S is designed to store an agent status record S1 and an agent search result S3, and has a second updating section (second updator) S3 which updates the status record S1 and the search result S2. The second updator S3 corresponds to "means for saving" in claims 1, 3, 4 and 9. The connection node S also has a response section S4 which sends the contents of the status record S1 and the search result S2 in response to an inquiry from the portable terminal P. This response section S4 corresponds to "means for sending" in claim 1.

Also included in the connection node S are the global ontology G similar to that in the portable terminal P and an ontology bridge B. This ontology bridge B is an information on the correspondence between each of the data items in the global ontology G and the item in each of the databases DB1–DB3. The local information such as an information on which node each database is in or record structures is stored in the connection node S as local ontology L.

That is, the ontology bridge B is used as a table or a dictionary for translating a search request based on the global ontology G to a search request for databases DB1–DB3, while the local ontology L represents database addresses or record structure necessary for the translated search request to be passed to the search system of databases DB1–DB3. The global ontology G, ontology bridge B, and local ontology L should be prepared in advance according to the predefined information on each of databases DB1–DB3. It should be noted that the global ontology G may match the local ontology L of some database.

An example of the global ontology G is shown:

---

% global ontology definition
% globalView (table, [column]),
%
globalView(salarytTable, [number, name, salary]).
In the above example, it is defined that the above-mentioned virtual single database contains a table "salaryTable" with three data items named number, name, and salary, respectively.
    Next, an example of the ontology bridge B is shown.
% ontology bridge
% bridge (global table, global column,
%         database name, table, column)
bridge (salaryTable, number, db1, syainMei, syainBango).
bridge (salaryTable, number, db2, salary2, number).
bridge (salaryTable, name, db1, syainMei, shimei).
bridge (salaryTable, name, db2, salary2, name).
bridge (salaryTable, salary, db1, kyuyo, honkyu).
bridge (salaryTable, salary, db2, salary2, salary).
    In the above example, the first line beginning with the reserved word "bridge("defines that, in the table "salaryTable" in the global ontology G, the data item "number" corresponds to the data item "syainBango" in the table "syainMei" in the actual database "db1".
    An example of the local ontology L is shown.
% local database location
% databaseLocation (database name, location)
%
databaseLocation (db1, host1).
databaseLocation (db1, host2).
% local database record
% localTable (databasename, [table name])
localTable (db 1, [syainMei, kyuyo]).
localTable (db2, [salary2]).
% local database column definition
% localColumn (database name, table name, [key attribute], [non-key
% attribute]).
localColumn (db1, syainMei, [syainBango], [shimei]).
localColumn (db1, kyuyo, [syainB ango], [honkyu]).
localColumn (db2, salary2, [number], [name, salary]).

---

In the above example, the first entry "local database location" gives a definition that the database "db1" is located in the node "host1" and others. The next entry "local database record" gives a definition that the database "db1"

has two tables "syain" and "kyuyo" and others. The last entry "local database column definition" gives a definition that, in the table "syainMei" in the database "db1", the data item "syainBango" with a key attribute may be specified as a search key but that the data item "shimei" with a non-key attribute cannot be specified as a search key.

[2-4. Configuration of the Node Manager]

Figure 3:
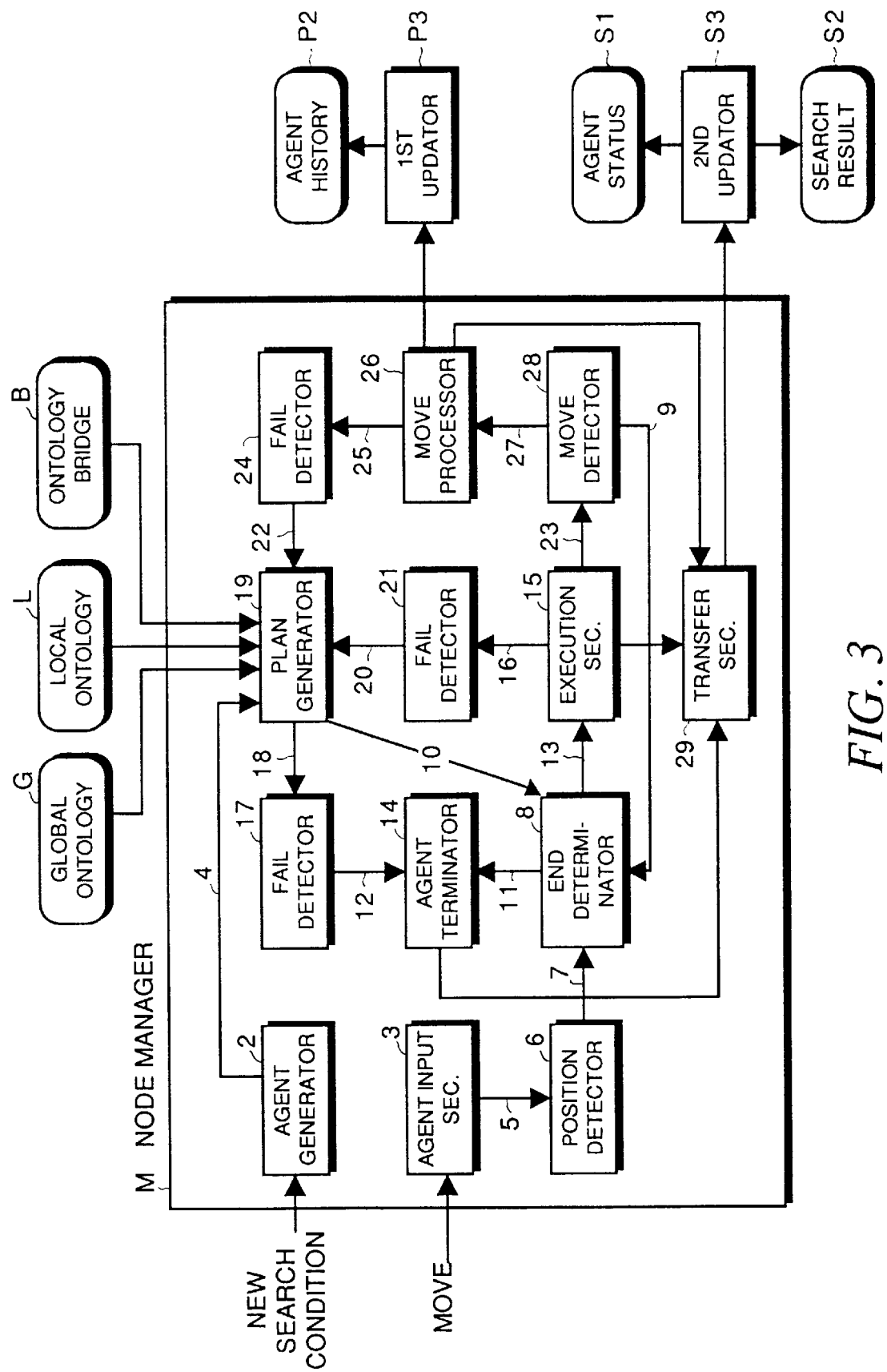
FIG. 3 is a functional block diagram showing the configuration of a node manager used in the embodiment of this invention.

The node managers MP, MS, and M1–M3, provided in each of the nodes of this apparatus, have an approximately similar configuration with each other. FIG. 3 shows a functional block diagram showing the configuration in details. In FIG. 3, an agent generating section 2 generates a new agent when a new search condition is given, which, in this apparatus, works only in the portable terminal P.

A plan generating section (plan generator) 19 generates a plan (script) which is the program of an agent, which corresponds to "means for generating a plan" in claim 1. An agent input section 3 accepts an agent coming from some other node. An execution start position detecting section (position detector) 6 determines where to start in the script of that agent. Information on where to start is passed as a part of data from the agent source when the agent moves.

A script end determination section (end determinator) 8 detects the end of the script and determines whether to end, and an execution section 15 executes the plan to implement the operation of the agent. An execution failure detection section (fail detector) 21 detects an execution failure of a plan caused by an error, a movement detection section (move detector) 28 detects a move instruction in a plan, a movement processing section (move processor) 26 moves an agent to some other node based on a detected move instruction. When an agent moves from the portable terminal P to the connection node S, the first updator P3 in the portable terminal P records that fact into the agent history P2.

A movement failure detection section (fail detector) 24 detects a movement failure caused by an error, a plan generation failure detection section (fail detector) 17 detects a plan generation failure, and an agent terminating section (agent terminator) 14 terminates an agent when plan execution ends or plan generation fails.

A transfer section 29 transfers information, generated during agent activity, to the second updator S3 in the connection node S. More specifically, when an agent moves from one node to another on the network N or when an agent is terminated, the transfer section 29 transfers information indicating the fact to the second updator S3 to cause the transferred information to be recorded as the status record S1. The transfer section 29 also transfers search results, generated in each of nodes H1–H3, to the second updator S3 to cause the transferred search results to be written into the search result S2. The status record S1 and the search result S2, called finders, function as a blackboard on which information generated through the agent activity, that is, information on what the agent is doing or what search results the agent obtained is written.

[3. Operation and Effect]
[3-1. Data Search Procedure]

Figure 4:
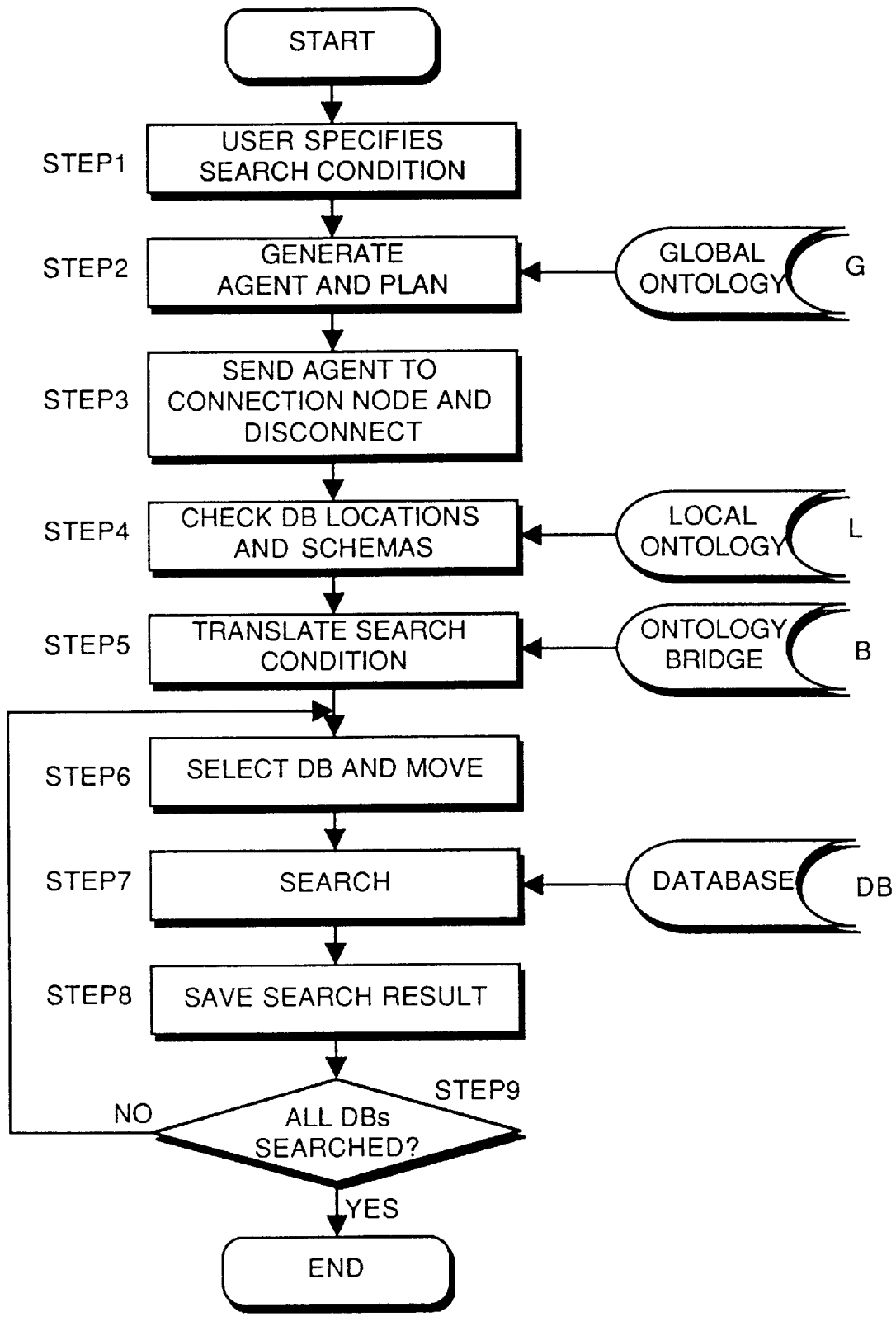
FIG. 4 is a flowchart showing a data search procedure used in the embodiment of this invention.

FIG. 4 shows the procedure for searching for data with the use of this apparatus that has the configuration described above. First, the user enters a search condition from the GUI input/output section P7 of the portable terminal P to search for desired data (step 1). FIG. 5 shows an example of the screen for specifying a search condition. When entering a search condition, the user may specify a search condition considering only the global ontology G, with no need for worrying about the actual structure of data stored in databases DB1–DB3. As a search condition, the user may specify that a particular data item which have a specified value should be searched for or that records having one or more specified keywords should be searched for in any columns. The user may also specify the name of a database to be searched or a period during which the records to be searched for were created. The fill-in-the-blanks form shown in FIG. 5 allows the user to specify any number of search conditions freely without worrying about the internal representation format of the global ontology G.

After filling in the required fields on the screen shown in FIG. 5, the user points to the launch button and click on it with the cursor of the pointing device and others. Then, the sending section P1 of the portable terminal P causes the agent generator 2 of the node manager MP to generate an agent (step 2) with a unique ID number assigned to the generated agent. Next, the sending section P1 causes the plan generator 19 of the node manager MP to generate a plan of the agent(step 2). The procedure for generating a plan will be described later. The outline processing of a plan is implemented by step 3 and the following steps shown in FIG. 4. The sending section P1 sends a signal to the movement processor 26 of the node manager MP to send the generated agent to the connection node S.

When sending the agent to the connection node S, the move processor 26 connects to the connection node S via the PHS line, sends agent and plan data to the connection node S to move the agent, and then disconnects the line (step 3). Sending the agent to the connection node S like this is called launching here. When the agent is launched to the connection node S, the ID number assigned to the agent, launch time, and search condition are sent from the movement processing section 26 to the second updator S3 via transfer section 29 and are recorded in the agent history P2.

A plurality of agents may be launched, one after another, before the search result of an already-launched agent is returned. For example, when a plurality of agents each having different search condition from each other are generated and launched from the portable terminal P to the connection node S in turn, the plurality of agents are present on the network N at the same time and are performing different search operation from each other.

An agent which is sent to the connection node S checks the nodes in which the databases DB1–DB3 are located and their schemas based on the local ontology L (step 4). At the same time, it translates the search condition specified based on the global ontology G in the portable terminal P, based on the ontology bridge B, to the search expressions compatible with the data structure of the databases DB1–DB3 (step 5).

Then, the agent selects one database from the databases DB1–DB3 being searched, moves to the node in which the selected database is located (step 6), and searches the database DB in that node using the translated search expressions (step 7). Then, the search result obtained through the search is sent from the agent to the connection node S where the received search result is stored as the search result S2 (step 8). Steps 6–8 are repeated until all databases are searched (step 9) and, when there is no more database to be searched, the search ends.

The data obtained as the search result may be returned unchanged from the agent to the connection node S to allow the connection node S to change the data to a format compatible with the global ontology G. Or, conversely, obtained data may be changed by the agent to a format compatible with the global ontology G in nodes H1–H3 where databases DB1–DB3 are located and then be sent to the connection node S.

[3-2. Agent Access to Databases]

Figure 6:
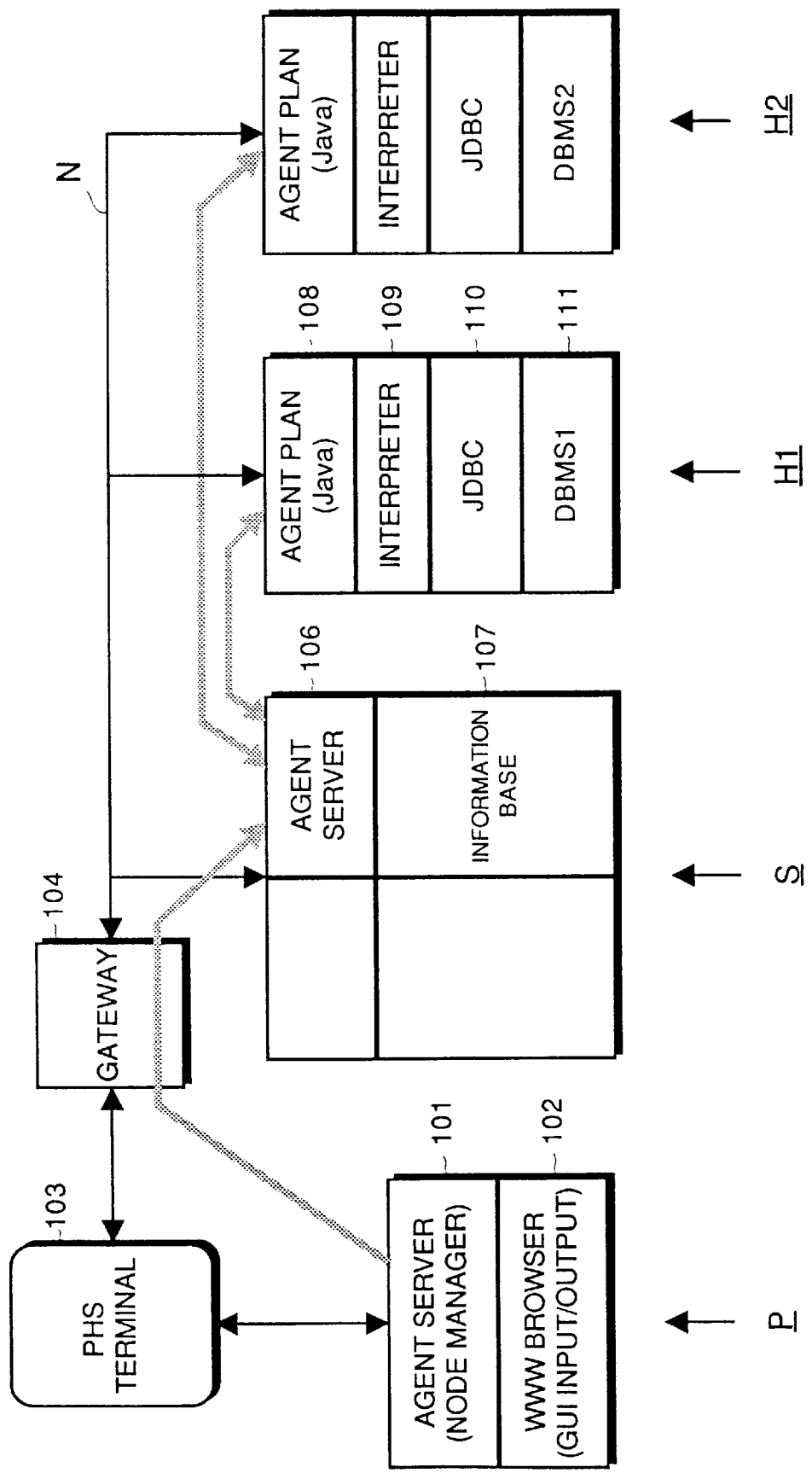
FIG. 6 is a conceptual diagram showing how an agent moves among nodes and accesses databases in the embodiment of this invention.

FIG. 6 is a conceptual diagram showing how an agent moving among nodes access databases. In FIG. 6, a broken line arrow indicates a path along which the agent moves. The agent servers 101 and 106, which are the node managers shown in FIG. 2, are means for inplementing agent activity.

As shown in FIG. 6, an agent generated by the agent server (node manager) of the portable terminal P moves, via a PHS terminal 103 and a gateway 104, to the agent server 106 of the connection node S. In the connection node S, the agent references an information base 107, such as an ontology bridge, and generates a plan for use in searching databases. The agent moves to a node, for example nodes H1 and H2, according to the generated new plan. The plan 108 of the agent is coded in Java or some other language, and the nodes H1 and H2 have an interpreter 109 for interpreting and executing the Java language. The Java language and an interpreter 109 accesses a database management system (DBMS) 111 using a special language such as JDBC (110).

[3-3. Detailed Agent Operation]

Figure 7:
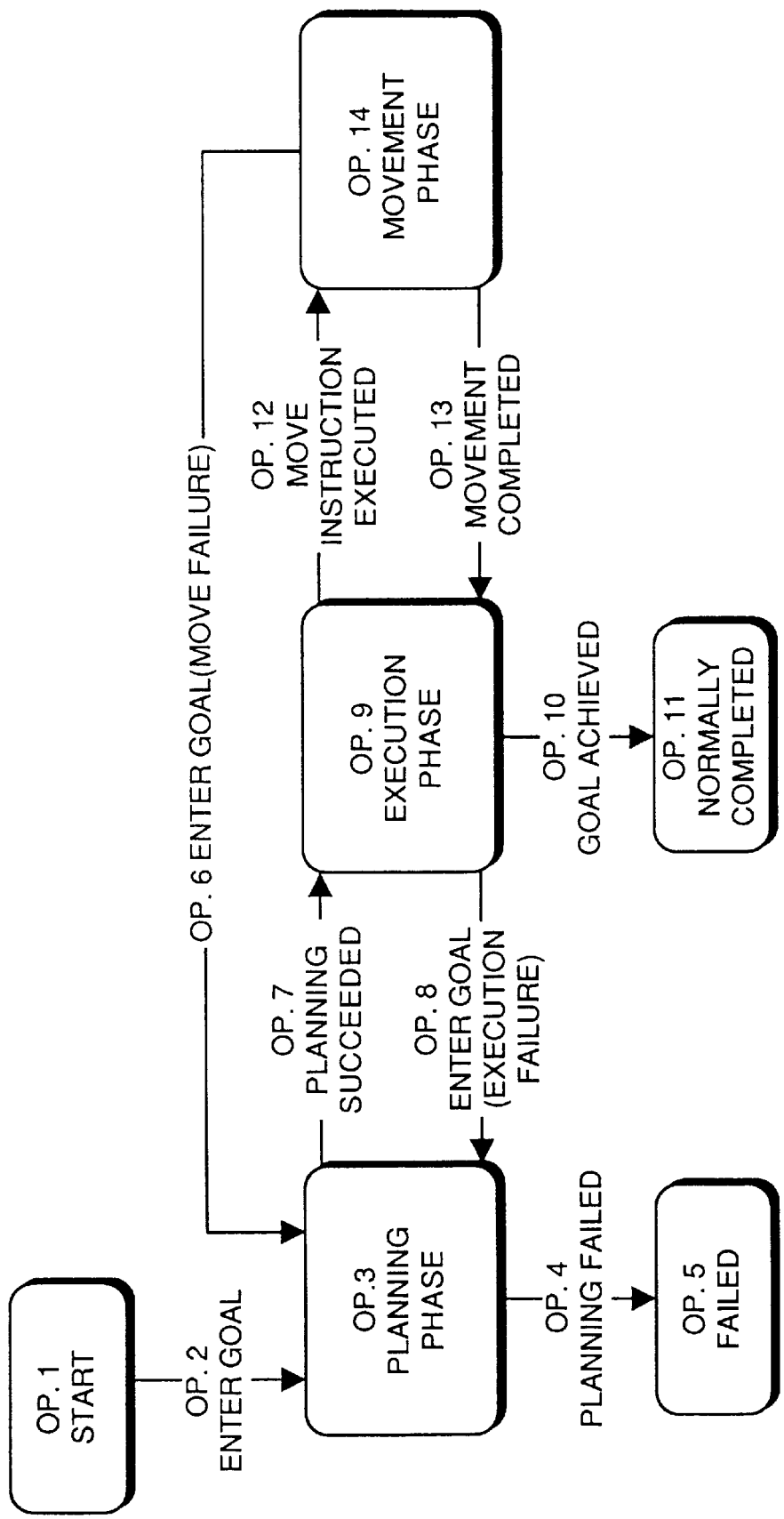
FIG. 7 is a flowchart showing how an agent behaves in the embodiment of this invention.

The above-mentioned search processing is implemented by the processing described below performing by the agent sent to the network N. The behavior of a single agent comprises the operations of an agent as shown in FIG. 7. When processing starts (operation 1), the agent moves among the three stages (phases), that is, the planning phase for generating a plan (operation 3), execution phase for executing the generated plan (operation 9), and movement phase for moving among nodes (operation 14), and finally normally completes (operation 11) or completely fails (operation 5). The agent behavior like this is implemented as described below by each of the components shown in FIG. 3. The more detailed description of the operation is disclosed in Japanese Patent Application No. 9-17681.

[3-3-1. Starting Agent Activity]

When a goal is given to the node manager M of any node, the agent generator 2 generates an agent and starts it (operation 1) and, at the same time, passes the given goal to the planning (operation 3) processing as the purpose of the plan (operation 2). A "goal" is the state to which the agent finally wants to move, and giving a goal is also called "entering" a goal. For example, when the user specifies a search condition on the portable terminal P, the sending section P1 receives this specification and gives the node manager MP as the goal the state "the search result is obtained for the search condition on all databases." The purpose of the agent is to achieve the given goal. The generated agent performs the following operations.

[3-3-2. Planning]p When the agent is generated (path 4 in FIG. 3), the plan generator 19 generates a plan to achieve the given goal (operation 3 in FIG. 7). A plan, which is the program of an agent, is also called script, and generating a plan is called planning. For example, for an agent generated on the portable terminal P for the search operation, the plan "move to the connection node S and then generate a plan for the search" is generated.

More specifically, a plan is generated by connecting a plurality of operations which become units between the goal state and the current state. That is, a plurality of those operations are prepared, in advance, as data and, for each operation, the post-condition generated as a result of the operation and the pre-condition that must exist in order to perform the operation are defined. During planning, an operation which generates the goal state as its post-state is found from the data, and then an operation which generates the pre-condition of that operation as its post-condition is found. This sequence is repeated. By back-tracking the cause-and-effect relation beginning at the goal state, an operation whose pre-condition matches the current state is eventually found. At this time, the plan is completed. The goal is achieved by executing the generated plan in the reverse order of plan generation.

If a sequence of operations for achieving the goal are not found, planning completely fails (operation 4 in FIG. 7). For example, if a goal which cannot be achieved essentially is given, that is, if the search for a non-existing record is given as the goal, planning completely fails. When the fail detector 17 finds that planning has failed (path 18 in FIG. 3), the agent terminator 14 terminates the agent, releases the resources of the agent, and other termination processing (path 12 in FIG. 3). In this case, the final state of the agent is a complete failure (operation 5 in FIG. 7).

[3-3-3. Plan Execution]

Once planning is generated successfully (operation 7 in FIG. 7), the agent enters the execution phase (operation 9 in FIG. 7). In the execution phase, the script end determinator 8 is activated (path 10 in FIG. 3). Until the end determinator 8 finds that control has reached the end of the plan (path 13 in FIG. 3), the execution section 15 sequentially executes the script in turn; that is, it reads, interprets, and executes commands in the execution position, one at a time. If, as a result of the interpretation and execution of the command, for example, a search result is obtained from a database, the transfer section 29 transfers this search result to the second updator S3 of the connection node S. Upon receiving the search result, the second updator S3 stores it as the search result S2.

In the execution phase (operation 9), the agent may fail generating errors during execution of various kinds of commands included in the script. For example, an attempt to access a database in a host may be rejected because the storage unit containing the file has an error. In this case, a command execution error occurs. The fail detector 21 monitors the status of the execution section 15 to detect such error (path 16 in FIG. 3).

When an execution failure is detected, the plan generator 19 is activated again (path 20 in FIG. 3) for re-planning (operation 8 in FIG. 7). In this case, the new goal is either the goal initially given or the goal of the failed command if it has (operation 8). For example, assume that a database has a spare file stored on another storage unit as well as the original file. Also assume that the initial plan contains a command telling the agent to "access the original node and, if the access is rejected, re-generate a plan to access the spare file."

In this case, if access to the original file is rejected, a new plan to access the spare file specified by the command (operations 8 and 3 in FIG. 3) is generated and this new plan is executed. Successful execution of the script to its end in the execution phase means that the agent has achieved the goal (operation 10 in FIG. 7). In this case, the agent ends normally (operation 11 in FIG. 7).

[3-3-4. Moving]

A plan may contain a movement command which moves the agent to another node. In the execution phase, the move detector 28 checks if the command being executed is a movement command (path 23 in FIG. 3). If the command being executed is a movement command, the movement processor 26 is activated (path 27 in FIG. 3) to pass control (operation 12 in FIG. 7) to the movement phase (operation 14 in FIG. 7). When the agent moves to another node, the data related to the agent is sent from the node manager M of the source node to the node manager M of the destination node according to a predetermined communication protocol.

The agent input section 3 of the destination node receives the sent data and, upon completion of movement (operation 13 in FIG. 7), the agent resumes operation beginning at the execution phase (operation 9 in FIG. 7). At this time, although the agent plan should start execution beginning at the command immediately following the movement command, the actual start position is determined by the position detector 6 according to the data that was received (paths 5 and 7 in FIG. 3).

When an agent has moved to another node, the data related to the agent stored in the source node is erased. The fact that the agent has moved from the portable terminal P to the connection node S is recorded by the first updating section P3 into the agent history P2 as agent launching. The fact that an agent has moved from one node to another in the network N is recorded into the status record S1 via the transfer section 29 and the second updator S3. Agent movement information which the node manager M of each node has accumulated in the status record S1 helps the response section S4 of the connection node S to quickly respond to a current agent status inquiry sent from the portable terminal P.

The fail detector 24 also monitors agent movement (path 25 in FIG. 3) and, when the movement fails due to an error such as a line trouble, detects that error. A movement failure is detected, for example, by the fact that the communication protocol with the destination mode does not work normally. When the movement fails, control is passed back to the planning phase (operation 6 in FIG. 7), as in the cases of other failures in other commands, and the plan is regenerated (operation 9 in FIG. 7).

For example, assume that a data base is provided, as well as a primary node, at a spare node where the same system is located, or a mirror site. Also assume that, in the original plan, a command is provided saying that "the agent moves to the primary node but, if the movement fails, the plan is regenerated to change the destination to the mirror site."

In this case, if the movement to the primary node fails due to an error such as a line trouble, a new plan is generated to move to the mirror site specified by the command (operations 8 and 3 in FIG. 7) and the generated new plan is executed. Successful execution of the script to its end in the execution phase means that the agent has achieved the goal (operation 10 in FIG. 7). In this case, the agent ends normally (operation 11 in FIG. 7). It should be noted that the configuration is not limited to that shown in FIG. 3. An operation log output section which saves a detailed record of agent operation into a predetermined file may also be added, which facilities the detection of the cause of an error.

[3-4 Referencing the Agent Status and Search Result]

To collect the search results which the agent has accumulated as described above, the user performs the following processing. The user who has launched an agent is disconnected from the line immediately after launching and is able to move freely. At a later time when the user is in a place where he or she can stay for a while and the PHS radio wave is stable, the user may reference the status of the agent and collect the search result.

Figure 8:
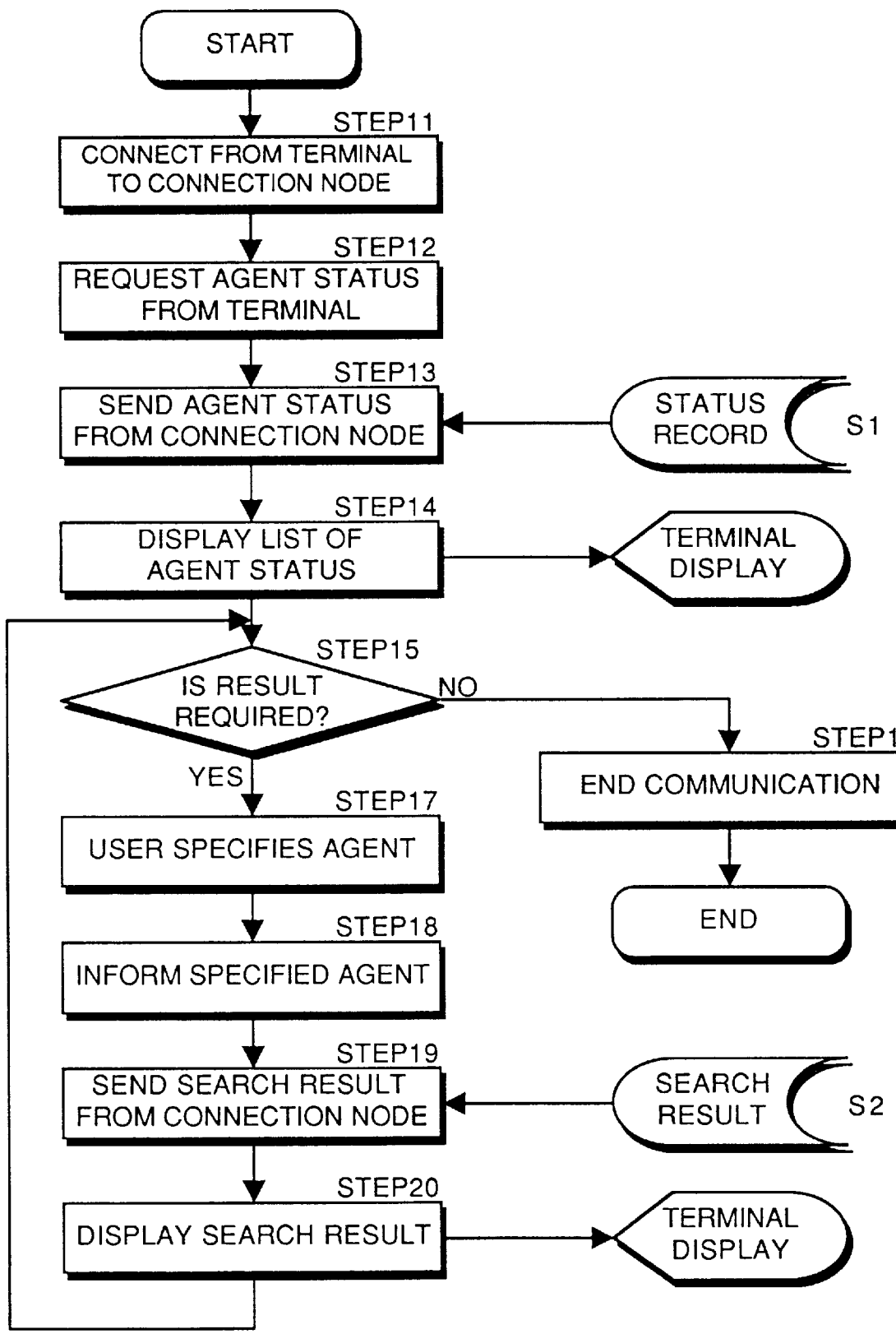
FIG. 8 is a flowchart showing a procedure for receiving the status record of an agent and search results in the embodiment of this invention.

FIG. 8 is a flowchart showing the processing procedure for referencing the status of an agent and for collecting search results. As shown in this figure, the user may reconnect to the connection node S from the portable terminal P over the PHS line (step 11) and may request the connection node S, via the use of GUI input/output section P7 and the inquiry section P4, to return the status of the agent.

More specifically, the inquiry section P4 and the GUI input/output section P7 of the portable terminal P of the user display a list of sent agents in the format shown in FIG. 9 based on the agent history P2. In this figure, the "NUMBER" column contains the unique ID number of an agent and the "LAUNCH DATE/TIME" column contains the date/time at which the agent was sent to the connection node S. The "ATTRIBUTE" column contains the status of the agent. That is, when the agent has not yet finished processing, the column contains "NR" (Not Returned) meaning that the agent is not yet returned from the connection node S; when the agent has finished processing with the search result in the connection node S, the column contains "R" (Returned); when the portable terminal P has already read the search result, the column contains "F" (Finished).

The "KEYWORD" column in FIG. 9 contains the keywords the user specified when generating the agent, in which, the search conditions for each data item are displayed. The "from/to" column contains a path along which the agent moved in the network N. For an agent whose status record S1 is not referenced at all after launching, the "ATTRIBUTE" and "from/to" columns are left blank; for other agents, the status at the time of last reference is displayed.

When the user clicks the "Current status" button with the mouse cursor, a status reference request is sent from the inquiry section P4 of the portable terminal P to the response section S4 of the connection node S (step 12). This request sends to the connection node S the IDs of all agents in the list whose attribute is not "F".

Upon receiving this request, the response section S4 of the connection node S sends the contents of the status record S1, corresponding to the agents whose IDs are received, to the inquiry section P4 of the portable terminal P (step 13). The inquiry section P4 updates the display screen based on the information that has been received; that is, it displays the latest information in the "ATTRIBUTE" and "from/to" columns. FIG. 10 is an example of the display screen that has been updated. For the agent status information, not only whether or not the agent has returned to the connection node S but also the node which the agent has reached is displayed; more detailed information, for example, information on a database being searched, may also be displayed.

For an agent whose "ATTRIBUTE" is "R" on the screen shown in FIG. 10, the user may request the connection node S to send back the search result. The user checks the status and then determines whether to make the request (step 15); when the user does not require the search result, he or she may end communication (step 16) to end processing. For an agent whose search result cannot be requested because attribute is "NR", the user should reconnect to the network N when the search is finished to reference the status record.

When the user wants to know the search result in step 15, he or she must click the column of the desired agent whose attribute is "R" or type the agent number from the keyboard (step 17). At this time, note that a plurality of agents launched by the user may be on the network N, each of which is performing a different job (search work) from each other. Therefore, the user must request the search result, one agent at a time.

When the user specifies an agent, the inquiry section P4 of the portable terminal P sends information as to which agent the user specified to the response section S4 of the connection node S (step 18). In response, the response section S4 of the connection node S sends the search result of the sent agent to the inquiry section P4 of the portable terminal P.

The inquiry section P4 of the portable terminal P displays a list of search results on the display screen of the GUI input/output section P7, as shown in FIG. 11. In this example, the "SEARCH DATABASE" column contains information as to which database contains data satisfying the specified search condition. In the example shown in FIG. 11, the three different host names in the "SEARCH DATABASE" column indicate that the several data items which satisfied the search condition were found in each of the three databases, DB1 to DB3 which were searched.

The "CONTENTS/SEARCH TARGET KEY" column contains the contents of the items corresponding to the data items specified by the search condition. The information in this column helps the user to find which record is of interest to the user. In the example shown in FIG. 11, only the ages are specified as the search condition. When the search is made with a plurality of data item combined, the contents of the plurality of data items are displayed.

In the example shown in FIG. 11, each record obtained from the database as the search result contains an image file which requires a long transmission time because of its size. Thus, each record is compressed into a small sample (thumbnail) before sending from the connection node S to the portable terminal P for display in the "IMAGE" column. Although an image, which is a sample of searched data, is not always necessary, it helps the user check the contents easily.

Figure 12:
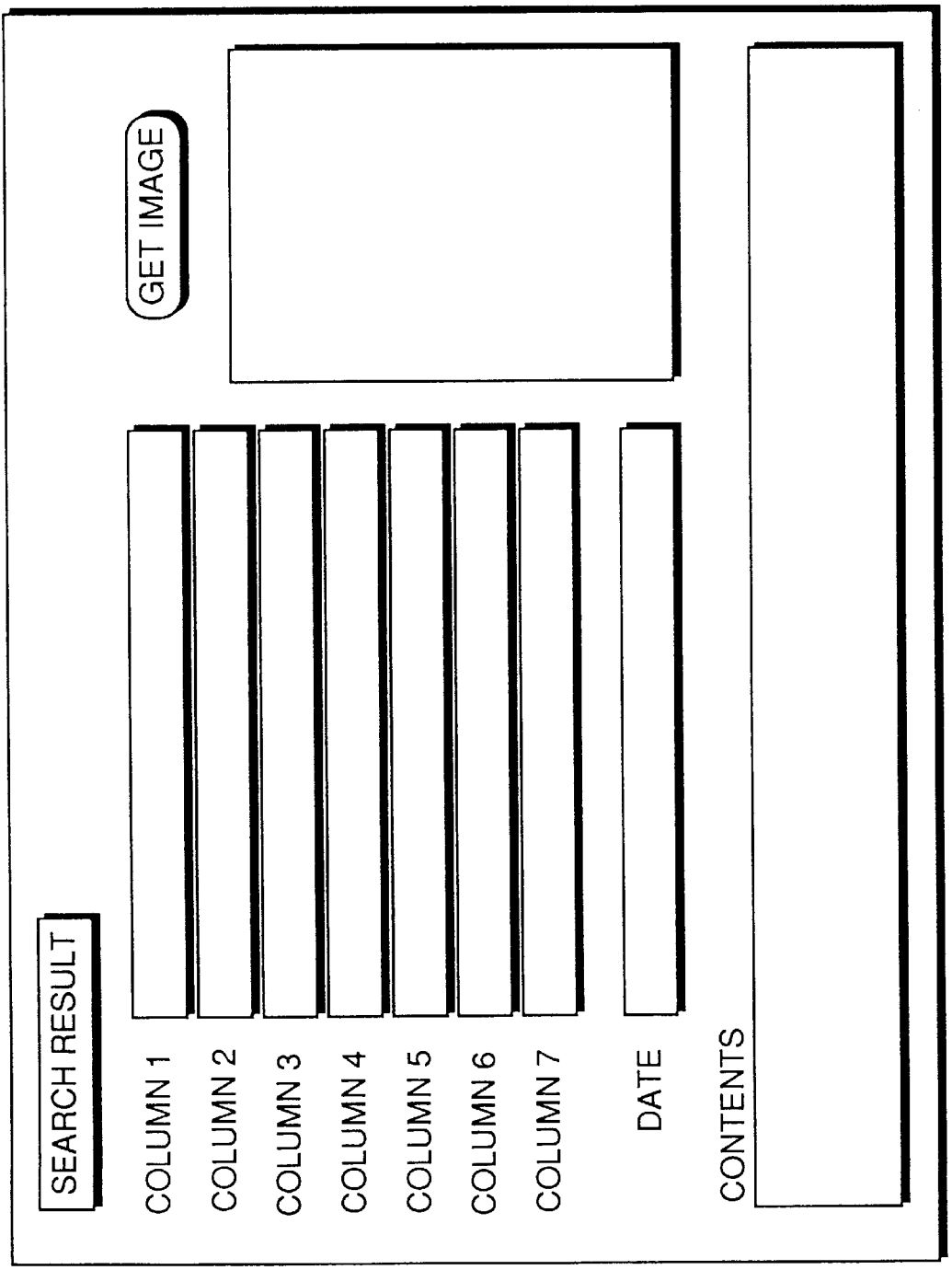
FIG. 12 is a diagram showing an example of the format of the screen on which one of search result records is displayed in the embodiment of this invention.

When the user clicks a record column on this display screen, data in all the columns of the record are displayed in the format shown in FIG. 12. In the example shown in FIG. 12, clicking the "GET IMAGE" button sends image data, which is not compressed, from the connection node S for display.

[3-5 Effects]

As described above, the data items common to a plurality of databases, DB1–DB3, are provided as the global ontology G in this embodiment. This allows the user to specify easily a search condition for the plurality of databases DB1–DB3 at a time with no concern over the data structure of each of the databases DB1–DB3.

In this embodiment, an agent searches the plurality of databases, DB1–DB3, in the network N independently according to the plan, eliminating the need for communication between the user and the network N during the search and thus reducing the amount of communication.

In this embodiment, even when a plurality of agents are sent from the portable terminal P to the network N, the portable terminal P keeps history data on the agents as the agent history P2. The information thus collected in the agent history P2 makes it easy to ask the network N about the status of the agents or to ask the network N to send the search results, enabling the user to use databases even over a line not suitable for mobile communication.

In this embodiment, even when a plurality of agents are sent to the connection node S, for each agent, the status record S1 of its activity and the search result S2 are saved. The apparatus according to this invention gives information on desired agents stored in those files to the user anytime the user wants, ensuring accessibility. In particular, because the status record S 1, search result S2, and response section S4 are all provided in the connection node S to which the terminal is connected, the apparatus gives quick response to an inquiry.

[4. Other embodiments]

It is to be understood that this invention is not limited to the embodiment described above and that various modifications may be made therein. Some other embodiments are described below. For example, when searching a plurality of databases using the global ontology G, the in-house terminal T on the network N may have a configuration similar to that of the portable terminal P so that the in-house terminal T may send an agent to another node. In addition, the portable terminal P need not always have a network manager M; for example, the portable terminal P, with only the GUI input/output section and the function for connecting to the network N, may connect to connection node S and use the node manager M in the connection node S to generate an agent. The expression "sending an agent" used in claims 1 and 8 is the this concept including this situation.

Furthermore, the global ontology is not limited to those data items common to a plurality of databases to the global ontology. For example, adding some of the items not common to two databases to the global ontology makes the data items for use in searching more versatile, giving the user more flexibility in specifying search conditions.

A computer readable medium having a data processing program recorded thereon for implementing the functionality of this invention is also an embodiment of this invention.

As described above, this invention allows the user to use a plurality of databases easily and to use databases over a line not suitable for mobile computing, further increasing the utilization of data.

While a preferred embodiment has been described, variations thereto will occur those skilled in the art of the scope of the present inventive concepts which are delineated by the following claims.

What is claimed is:

1. A data processing apparatus having a host system having a plurality of different databases and a terminal for connecting to said host system over a remote line, said data processing apparatus comprising:

means for sending to said host system an agent which has a search condition given based on a global ontology representing a plurality of data items which can be searched in said plurality of databases;

means for generating a plan based on an ontology bridge representing a correspondence between a data item of said global ontology and an item in at least one of databases, said plan being used by the agent to access databases;

means for saving onto said host system a search result obtained through database search performed by said agent based on said plan; and means for sending the saved search result back to said terminal.

2. The data processing apparatus according to claim 1, wherein said remote line is a line temporarily connected when said host system sends data to, or receives data from, said terminal.

3. The data processing apparatus according to claim 2, wherein said host system comprises:

means for activating said one or more agents sent from said terminal; and means for saving said data, generated through agent activity, for each agent.

4. The data processing apparatus according to claim 1, wherein said host system is a computer network including a plurality of nodes.

5. The data processing apparatus according to claim 4, wherein said plan includes a move instruction to move said agent from one node to another, said apparatus further comprising:

means for executing said generated plan;

means for executing said move instruction; and means for detecting the failure of the execution of the plan or said movement, said means for generating is designed to regenerate said plan when said failure is detected.

6. The data processing apparatus according to claim 1, wherein said host system comprises:
   means for activating said one or more agents sent from said terminal; and
   means for saving said data, generated through agent activity, for each agent.

7. The data processing apparatus according to claim 1, wherein said means for generating is designed to change the given search condition to a search expression for at least one of databases based on said ontology bridge and to add it to said plan.

8. A data processing apparatus having a host system where an agent performs data processing and a terminal for connecting to said host system over a remote line, wherein said terminal comprises:
   means for sending one or more agents for data processing to the host system;
   means for recording a history that one or more agents are sent to the host system; and
   means for receiving data generated through activity of said one or more agents, based on said recorded history, from said host system.

9. The data processing apparatus according to claim 8, wherein said data generated through activity represents at least one of the current status of each agent and said search result.

10. The data processing apparatus according to claim 9, wherein said terminal comprises:
    means for displaying said current status of each agent; and
    means for displaying said search result corresponding to specified agent.

11. The data processing apparatus according to claim 8, wherein said host system comprises:
    means for activating said one or more agents sent from said terminal; and
    means for saving said data, generated through agent activity, for each agent.

12. A data processing method wherein a host system having a plurality of different databases and a terminal for connecting to said host system over a remote line are used, said data processing method comprising the steps of:
    sending to said host system an agent which has a search condition given based on a global ontology representing a plurality of data items which can be searched in said plurality of databases;
    generating a plan based on an ontology bridge representing a correspondence between a data item in said global ontology and an item of at least one of databases, said plan being used by the agent to access databases;
    saving onto said host system a search result produced through database search performed by said agent based on said plan; and
    sending the saved search result back to said terminal.

13. The data processing method according to claim 12, wherein said host system is a computer network including a plurality of nodes; and
    said plan includes a move instruction to move said agent from one node to another; said method further comprising the steps of:
    executing said generated plan;
    executing said move instruction; and
    detecting the failure of the execution of the plan or said movement,
    said step of generating regenerates said plan when said failure is detected.

14. The data processing method according to claim 12, wherein said step for generating changes the given search condition to a search expression for each database based on said ontology bridge and adds it to said plan.

15. A data processing method wherein a host system where an agent performs data processing and a terminal for connecting to said host system over a remote line are used, said method comprising the steps of:
    sending one or more agents for data processing from said terminal to the host system;
    recording a history that one or more agents are sent to the host system in said terminal; and
    receiving data generated through activity of said one or more agents, based on data recorded in said history, from said host system by said terminal.

16. The data processing method according to claim 15, wherein said data generated through activity represents at least one of the current status of each agent and said search result.

17. A computer readable medium having a data processing program recorded thereon, wherein said data processing program uses a host system having a plurality of different databases and a terminal for connecting to said host system over a remote line, said data processing program causing a computer to:
    send to said host system an agent which has a search condition given based on a global ontology representing a plurality of data items which can be searched in said plurality of databases;
    generate a plan based on an ontology bridge representing a correspondence between a data item in said global ontology and an item of at least one of databases, said plan being used by the agent to access databases;
    save onto said host system a search result produced through database search performed by said agent based on said plan; and
    send the saved search result back to said terminal.

18. The computer readable medium having a data processing program recorded thereon according to claim 17, wherein said data processing program causing a computer to change the given search condition to a search expression for each database based on said ontology bridge and to add it to said plan.

* * * * *